Patented Apr. 7, 1936

2,036,190

UNITED STATES PATENT OFFICE 2,036,190

METHOD OF PRODUCING A CERAMIC BODY

Raymond C. Benner and Henry N. Baumann, Jr., Niagara Falls, N. Y., assignors to The Carborundum Company, Niagara Falls, N. Y., a corporation of Pennsylvania No Drawing. Application December 30, 1932, Serial No. 649,593

3 Claims. (Cl. 106—9)

Our invention relates to an improvement in ceramic bodies and methods of producing them. It in particular concerns ceramic ware which is mechanically tough and which is highly resistant to thermal shock.

We have found that ceramic bodies which are made from particles of certain prefused alumino-silicates of elements of the second periodic group, as for example 14% MgO, 35% $Al_2O_3$ and 51% $SiO_2$, may be self-bonded when heated, to approximately 1375° C. in the case of the compound just mentioned and that after being so bonded the articles produced are extremely resistant to thermal shock and are remarkably strong mechanically.

Other silicates (usually alumino-silicates) of elements of the second periodic group which we have found to possess the desired properties after suitable heat treatment are the following:—

| 1 | | 2 | | 3 | | 4 | |
|---|---|---|---|---|---|---|---|
| | Percent | | Percent | | Percent | | Percent |
| BaO | 41 | ZnO | 73 | CaO | 20 | GlO | 14 |
| $Al_2O_3$ | 27 | $SiO_2$ | 27 | $Al_2O_3$ | 37 | $Al_2O_3$ | 19 |
| $SiO_2$ | 32 | | | $SiO_2$ | 43 | $SiO_2$ | 67 |

The fourth example requires material which is too expensive for ordinary use but is included to show the family relationships involved in the production of our materials.

To manufacture material of this type we prepare a dry mixture made from talc, bauxite, clay and/or other materials of suitable composition and purity proportioned to give closely as possible the desired chemical composition, and feed this mixed material into an electric arc furnace of the water cooled pot type commonly used for the production of fused alumina abrasives. In the furnacing of this material considerably higher voltages are required however than are used in fusing alumina, 400 volts and higher being required for even a small furnace where the percentage of silica is high and the percentage of alkaline earth low. In order to minimize the voltage required the alumina may be fused alone first and the other ingredients added slowly to the fused bath, the silica being added last. As fusion progresses the electrodes are gradually raised although the arc is kept "smothered" at all times, and a pot of material built up.

The fused material is usually allowed to cool in the furnace if it is desired to produce granular devitrified material which is subsequently to be bonded, since the devitrification progresses automatically during the slow cooling process.

In cases where solid impervious bodies are desired however, it is preferable to cast the molten material directly into molds in which the cast material is allowed to solidify. The material is then removed from the mold while still hot and annealed to prevent cracking. The annealing of the cast magnesium alumino silicate material should be done at approximately 1375° C. if it is desired to produce a body highly resistant to thermal shock, or at a temperature below 800° C. if it is desired to produce a mechanically tough glassy body. The annealing and burning temperatures of the various materials vary according to composition and purity of course, although in each case annealing should be at a higher temperature or for a longer time when resistance to thermal shock is desired than where mechanical toughness is the primary requisite.

Devitrification seems to progress faster with crushed material than when the material is in large pieces, so that in cases where devitrified granular material is to be used in a manner which does not involve heating it above red heat, the pig or casting is crushed to form approximately the size particles desired and the crushed material (if devitrification is not already sufficiently complete) is placed in saggers and heated to 1375° C. for an hour to devitrify it. This treatment also sinters the pieces together slightly, so that it is afterward necessary to recrush to the desired size.

In cases on the other hand, where the material in the course of its further fabrication or use is heated to temperatures sufficient to devitrify it, it is obviously unnecessary to give it this special devitrifying heat treatment and the crushed material may be incorporated directly in the raw ceramic batch.

Another method of preparing granular material, i. e. flowing the molten material slowly into a stream of water sufficient to carry it along to a settling bay, may be used instead of crushing, but it should be understood that such a chilling treatment must be followed by a devitrifying heat treatment as above noted in order to develop the low coefficient of expansion which is the principal advantage of bonded material of this sort.

As noted above, the material is very resistant to mechanical shock when in its original glassy form. In this form the magnesium alumino-silicate is usually a beautiful black glass, capable of taking a high polish and of utility in the manufacture of high grade desk tops for example.

Upon devitrification the mechanical strength decreases but the resistance to thermal shock increases.

We have found that it is often possible to secure the desired properties by the incorporation of the ingredients in a raw batch without prefusing them and burning the articles formed from such a batch at a temperature such that the ceramic material first vitrifies and then devitrifies. This action takes place so rapidly on burning to 1375° C. that only the devitrified product is normally recognized and also takes place somewhat more slowly at temperatures as low as 1000° C.

We have found that our devitrified products are characterized by an extremely low coefficient of expansion, the average value between the temperatures 0° and 500° C. being less than $2.5 \times 10^{-6}$. From 0° C. to 200° C. the coefficient is even less, in certain cases (notably the magnesium alumino silicate) being less than $0.5 \times 10^{-6}$ in this range. This property doubtless accounts for the extreme resistance to thermal shock of bodies embodying this material.

The coefficient of expansion of the glassy fused material is in general slightly higher than that of the devitrified product, although in the case of calcium alumino silicate the reverse seems to be the case. It may also be noted that in general the coefficient is lowest for the magnesium compounds and highest for the calcium and barium, although even in the latter cases $2.5 \times 10^{-6}$ is secured.

In certain instances we have found it desirable to incorporate devitrified material of this low coefficient of expansion in other bonding agents so as to produce a resultant body of low coefficient of expansion. For instance, in certain types of adhesives for joining larger segments of abrasive wheels it is essential that the cement have the same coefficient of expansion as the abrasive. We have found that by incorporating our new material together with phenolic condensation resins it is possible to secure an excellent cement for this purpose in which the coefficient of expansion may be made of any desired value from $1.5 \times 10^{-6}$ to $45.0 \times 10^{-6}$. In such cases the coefficient is dependent upon the density or packing of our material, its percentage and the nature of the resin used, being lowest with high percentages of our densely packed material.

Similarly in certain ceramic bodies where it is desired that the texture shall be somewhat "flexible" to prevent breakage due to thermal shock, etc., we incorporate a substantial proportion of our material in place of the grog in an ordinary ceramic body. In this way greater "flexibility" seems to be imparted to the body so that it is not as subject to damage by thermal shock. As an example of such a body we may make glass tank blocks of mixtures within the following range:

|  | Percent |
| --- | --- |
| Our devitrified material | 10 to 40 |
| Clay grog | 30 to 75 |
| Ball clay | 5 to 20 |
| Kaolin | 5 to 30 |

The advantage of the use of prefused material rather than the original raw ingredients lies in the fact that with the prefused material, uniformity is more readily attained and shrinkage is very greatly decreased so that molding is simplified and a denser body may be secured.

Bodies of the type comprising our invention have proved useful for large chemical ware or for laboratory ware where ability to resist thermal shock is important, for baking dishes and other household utensils, and for spark plugs.

In the manufacture of self-bonded articles from our material we preferably grind the material to 100 mesh and finer and after incorporation of a suitable temporary binder such as dextrin we either press or slip-cast the powdered material in molds to form the desired material. These formed articles are then removed from the molds, dried and burned at suitable temperatures, which are from 1100° C. to 1400° C. in the case of the magnesium alumino silicate. Burning of the molded articles, particularly at the higher temperatures, is best conducted with the articles buried in sand or other granular refractory material.

Having thus described our invention, what we claim is:

1. The steps in the method of fabricating ceramic articles whose normal use involves the experience of sudden temperature changes which comprise forming an article of a vitrified alkaline earth silicate and causing the vitrified material to devitrify to form a body having a coefficient of expansion of less than $2.5 \times 10^{-6}$.

2. The process of producing a ceramic body whose normal use involves the experience of sudden temperature changes which comprises fusing a composition comprising silica, alumina and an alkaline earth oxide, allowing said composition to cool, crushing it, forming the crushed material into a desired shape and firing said shape to devitrify said composition.

3. The steps in the process of producing ceramic articles whose normal use involves the experience of sudden temperature changes which comprise melting together a mixture consisting of substantially 15% magnesia, 35% alumina and 50% silica, forming the material so produced into a body of a desired shape, and heat treating the body below the fusion point at a temperature between 1200° C. and 1400° C.

RAYMOND C. BENNER.
HENRY N. BAUMANN, Jr.